United States Patent
Iwasaki

(10) Patent No.: US 8,814,528 B2
(45) Date of Patent: Aug. 26, 2014

(54) PRODUCTION METHOD OF LEADING EDGE REINFORCEMENT OF FAN BLADE

(75) Inventor: Takayuki Iwasaki, Tokyo (JP)

(73) Assignee: IHI Corporation, Tokyo (JP)

( * ) Notice: Subject to any disclaimer, the term of this patent is extended or adjusted under 35 U.S.C. 154(b) by 521 days.

(21) Appl. No.: 13/145,350

(22) PCT Filed: Jan. 22, 2010

(86) PCT No.: PCT/JP2010/050763
§ 371 (c)(1),
(2), (4) Date: Jul. 20, 2011

(87) PCT Pub. No.: WO2010/084941
PCT Pub. Date: Jul. 29, 2010

(65) Prior Publication Data
US 2011/0274551 A1    Nov. 10, 2011

(30) Foreign Application Priority Data
Jan. 22, 2009   (JP) ................................ 2009-012144

(51) Int. Cl.
*B21D 26/049* (2011.01)
*B23P 15/02* (2006.01)

(52) U.S. Cl.
USPC .......................... 416/224; 29/889.7; 29/421.1

(58) Field of Classification Search
USPC ................... 29/889.7, 421.1, 525.13, 525.14; 416/223 R, 224, 241 R
See application file for complete search history.

(56) References Cited

U.S. PATENT DOCUMENTS

2005/0278950 A1*   12/2005   Despreaux et al. ........ 29/889.71

FOREIGN PATENT DOCUMENTS

| JP | 50 67266 | 6/1975 |
| JP | 57 191496 | 11/1982 |
| JP | 4 157141 | 5/1992 |
| JP | 8 134625 | 5/1996 |
| JP | 11 47859 | 2/1999 |
| JP | 2005 256838 | 9/2005 |

OTHER PUBLICATIONS

International Search Report issued Feb. 23, 2010 in PCT/JP10/50763 filed Jan. 22, 2010.
U.S. Appl. No. 13/145,015, filed Jul. 18, 2011, Iwasaki.

* cited by examiner

*Primary Examiner* — Ned Landrum
*Assistant Examiner* — Justin Seabe
(74) *Attorney, Agent, or Firm* — Oblon, Spivak, McClelland, Maier & Neustadt, L.L.P.

(57) ABSTRACT

A production method enables use of ultrasonic forming but does not leave a bonding face in a final product.
One cuts into a plate member having a first side face and a second side face from the first side face toward the second side face to form a slit that does not reach the second side face; seals lips of the slit to leave an opening; causes superplastic forming of the plate member by pressurizing the plate member in a mold with gas through the opening; and cuts out a portion including the sealed lips.

5 Claims, 5 Drawing Sheets (a)

(b)

(c)

(d)

(e)

(a)

(b)

(c)

(d)

(e)

PRODUCTION METHOD OF LEADING EDGE REINFORCEMENT OF FAN BLADE

TECHNICAL FIELD

The present invention relates to a method of production of members for reinforcing leading edges of fan blades applied to a fan of a jet engine.

BACKGROUND ART

A jet engine is for example comprised of a fan assembly, a high-pressure compressor, a combustor, a turbine and other assemblies, in the order from the foremost stage to the rear. Ambient air sucked by the fan assembly is compressed and introduced into the combustor by the high-pressure compressor, and is there mixed with fuel and then used for combustion. High-temperature gas flow at high pressure generated by the combustor is introduced into the turbine and there energy is extracted from the gas flow.

As directly sucking ambient air, the fan assembly is exposed to hard impact by foreign matters impinging thereon. In particular leading edges of fan blades require excellent impact resistance. One of solutions to requirement for such localized impact resistance may be, for example, to add reinforcements having high impact resistance limitedly to the leading edges of the fan blades.

On the other hand, fan blades require not-simple three-dimensional surfaces in order to realize good aerodynamic properties, and thus surfaces of the leading edge reinforcements are required to be in conformity therewith. However, most of materials having high impact resistance have poor workability and it is even hard to carry out cold working on these materials. How to execute such three-dimensional surface machining is a technical problem. Further, in such reinforcements, required thickness in view of impact resistance varies from its most leading portion to peripheral portions. In a point about how a sectional profile according to a required thickness distribution is given to its final shape, technical issues may exist.

More specifically, consistence of high impact resistance and three-dimensional surface machinability is for itself a challenging technical problem.

Japanese Patent Unexamined Publication 2005-256838 discloses a production method of leading edges of fan blades using superplastic forming. This art applies diffusion bonding instead of cold bending to formation of an envelope structure for being served to superplastic forming, thereby overcoming the problem in machining of complex shapes such as the leading edges of the fan blades.

DISCLOSURE OF INVENTION

The present inventors have made a keen study of a process of fracture which may occur during long term use. The inventors have consequently found out that cracking or fracturing frequently appears along particular faces and have further estimated that these faces may originate in diffusion bonding faces. Diffusion bonding is so sensitive to cleanness of faces before bonding and thus it is a common way to carry out inspection such as ultrasonic flaw detection on bonded portions after diffusion bonding for the purpose of assuring that no defect exists. However, the inventors have found out in the course of the study that, as maybe detection limits of such detection technics govern, or after long term use even if a product has no defect, still there is a concern about occurrence of fracture which originates in diffusion bonding faces.

Turning now, according to the art disclosed in aforementioned JP 2005-256838, diffusion bonding faces are disposed at the foremost edges which are most severely exposed to impact among portions of leading edge reinforcements. It naturally gives rise to a concern about any problem in view of safety improvement.

The present invention has been achieved in view of the aforementioned problem and provides a method of production of members for reinforcing leading edges of fan blades without leaving diffusion bonding faces in final products although it employs superplastic forming.

According to a first aspect of the present invention, a production method of a leading edge member of a fan blade comprises the steps of cutting into a plate member having a first side face and a second side face from the first side face toward the second side face to form a slit that does not reach the second side face; sealing lips of the slit to leave an opening; causing superplastic forming of the plate member by pressurizing the plate member in a mold with gas through the opening; and cutting out a portion including the sealed lips.

Preferably, the plate member consists essentially of a titanic superplastic material. More preferably, the step of causing the superplastic forming includes heating the plate member up to from 750 degrees C. to 950 degrees C. Alternatively preferably, the step of sealing is executed by one selected from the group consisting of welding, brazing, pressure bonding, and press-fitting to the mold. Further preferably, the production method further comprises the step of giving a thickness distribution to the plate member.

According to a second aspect of the present invention, a leading edge member of a fan blade is provided, wherein the leading edge member is produced by any of the aforementioned methods.

According to a third aspect of the present invention, a fan blade applied to a fan of a jet engine is provided, wherein the fan blade comprises the leading edge member.

BEST MODE FOR CARRYING OUT THE INVENTION

Certain embodiments of the present invention will be described hereinafter with reference to the appended drawings.

Figure 5:
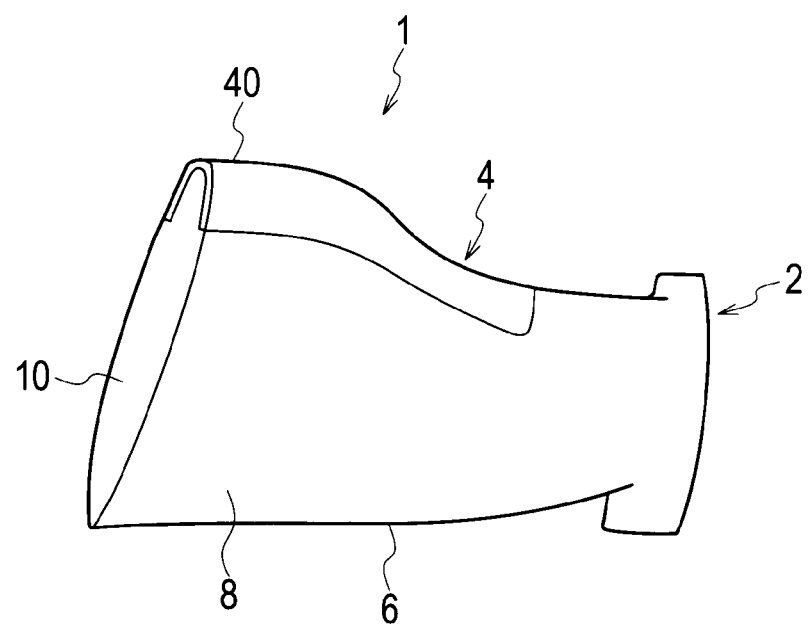
FIG. 5 is a perspective view of a fan blade along with the leading edge reinforcement.

Referring to FIG. 5, a fan blade 1 has a leading edge 4 and a trailing edge 6 extending from a root 2, and is comprised of a pressure side 8 and a suction side 10 smoothly linking between the leading edge 4 and the trailing edge 6. When the fan blade 1 rotates, air is fed from the leading edge 4 toward the trailing edge 6. The leading edge 4 is, to the greatest extent, subject to impact by foreign particles in the air colliding thereon and thus a leading edge reinforcement 40 is added thereto in order to protect and reinforce this part.

Figure 1:
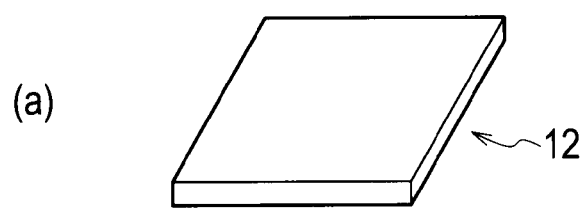
FIG. 1 is a drawing descriptive of each step in the order of execution before superplastic forming in a method of production according to a first embodiment of the present invention.
Figure 1:
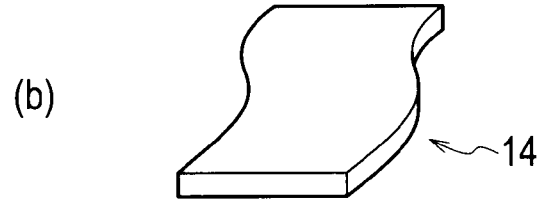
Figure 1:
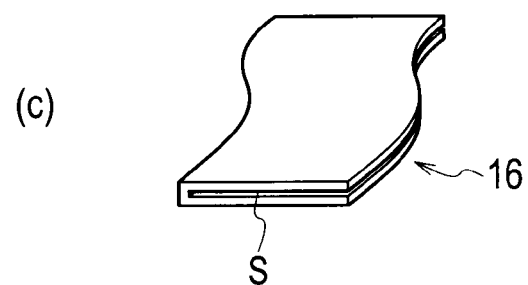
Figure 1:
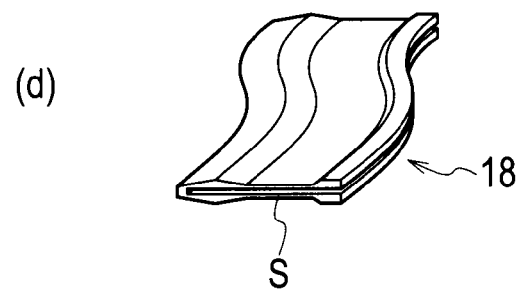
Figure 1:
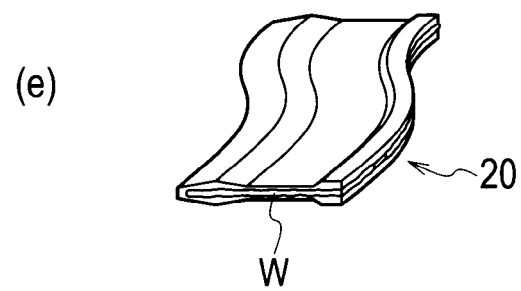

The following is a production method of the leading edge reinforcement 40 in accordance with the first embodiment. Referring to FIG. 1(a), first prepared is a planar plate member 12 having an arbitrary outline such as a rectangular shape. Any material can be applied thereto as long as the material has impact resistance and is capable of developing superplasticity when properly heated. As such materials, titanic superplastic materials can be exemplified. Further, as the titanic super plastic materials, a Ti-6Al-4V alloy, a Ti-5Al-2.5Sn alloy, a Ti-8Al-1Mo-1V alloy, a Ti-8Mn alloy, a Ti-7Al-4Mo alloy, a Ti-4.5Al-3V-2Fe-2Mo alloy and such can be exemplified.

Referring to FIG. 1(b), the plate member 12 is processed to make its outer periphery into a proper outline. Applied to the processing is any known method such as blanking by pressing, machining, water-jet machining and such.

The processed plate member 14 is served to slit forming as shown in FIG. 1(c). The plate member 14 is cut into from one side face thereof toward another side face not to reach said another side face, more specifically to leave said another side face connected, to form a slit S. The thickness from a bottom of the slit S to a surface of said another side face will be reflected in a thickness of a leading edge portion of the leading edge reinforcement 40 after superplastic forming. More specifically, by properly regulating the thickness at issue, the thickness of the leading edge portion of the leading edge reinforcement 40 can be regulated. The slit forming is executed by means of a machining center with a known tool such as a side cutter or an end mill. In a case of simple shapes, wire-cutting may be used.

The plate member 16 with the slit S is preferably served to forming for the purpose of giving a thickness distribution as shown in FIG. 1(d). Giving this thickness distribution is to realize an objective sectional profile after superplastic forming as a post-process. An optimum thickness distribution can be determined through calculator simulations in combination with experiments. The slit forming may be postponed after giving the thickness distribution. After finishing the processes by these steps, a plate member 18 having the slit S is obtained.

Next referring to FIG. 1(e), lips of the slit S are sealed with a welding material W to leave an opening for introducing gas used for superplastic forming. While the opening is drawn on the right, rather at the front, in FIG. 1(e), the opening may be disposed in any place as long as it goes well to introduce gas G used for superplastic forming as later described. The sealing is preferably carried out by TIG welding for example. In a case where the plate member is formed of the Ti-6Al-4V alloy, YTAB640 as a welding material and argon gas as a shielding gas are preferably used. In combination with the TIG welding, a step for fixing or pressing the plate member by any jig to narrow the gap of the slit S may be applied. Further, instead of the TIG welding, brazing or pressure bonding can be used for sealing. After these steps, a plate member 20 having an envelope structure with the opening is obtained.

Further bending or twisting is applied to the plate member 20 as needed. This step may be executed at any stage after the slit forming. Alternatively bending or twisting may be executed simultaneously with superplastic forming as described later.

Figure 2:
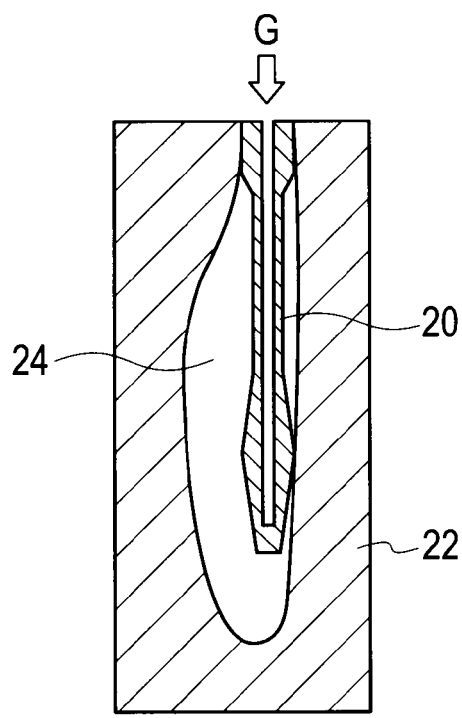
FIG. 2 is a sectional view descriptive of the superplastic forming in the method of production according to the embodiment.

Superplastic forming will be carried out with a mold 22 shown in FIG. 2. The mold 22 is comprised of a proper heater capable of realizing elevated temperatures required for the superplastic forming. The mold 22 has a cavity 24 having an approximate form of a geometric shape that a leading edge member requires, and the plate member 20 with the envelope structure is housed in the cavity 24. By means of a heater, alone or in combination with heating by heated gas G, the plate member 20 is heated up to a proper temperature. The temperature is any falling within the range from 750 to 950 degrees C. in cases of titanic superplastic alloys, however, it may be properly determined according to a material of the plate member 20. In a case where the material is the Ti-6Al-4V alloy, as taking a temperature range where superplasticity realizes into consideration, temperatures about 900 degrees C. may be properly selected. Further, in cases of the Ti-4.5Al-3V-2Fe-2Mo alloy or such, lower temperatures such as from 750 to 800 degrees C. may be preferable. With keeping the plate member 20 at such a proper temperature, the gas G is introduced through the opening of the plate member 20 so as to pressurize its interior, thereby carrying out superplastic forming.

Figure 3:
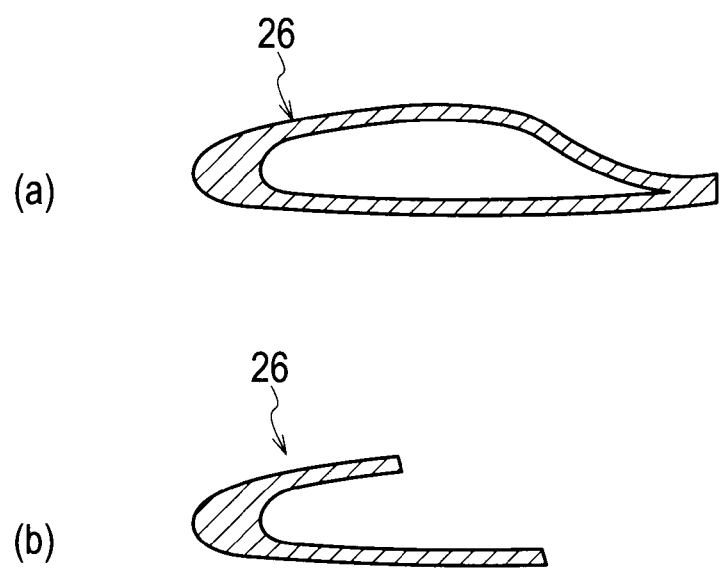
FIG. 3 shows sectional views of a plate after the superplastic forming and after cutting.
Figure 4:
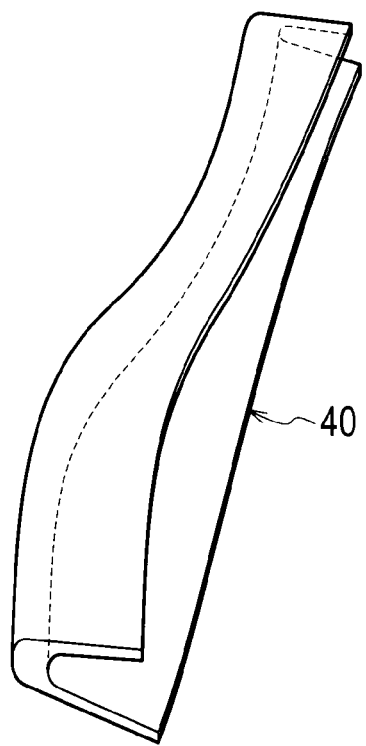
FIG. 4 is a perspective view of a leading edge reinforcement.

As the plate member 20 undergoes the superplastic forming, it comes to form a hollow structure 26 shown in FIG. 3(a) for example. Any particular portions including the sealed lips in the structure 26 are cut out as shown in FIG. 3(b) to shape the structure into a final product shape, thereby obtaining a leading edge reinforcement 40 having a geometric shape as shown in FIG. 4. Finishing the leading edge reinforcement 40 may be carried out at this stage, or alternatively carried out after installing it in a fan blade.

Figure 6:
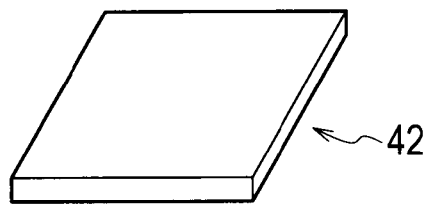
FIG. 6 is a drawing descriptive of each step in the order of execution before superplastic forming in a method of production according to a second embodiment of the present invention.
Figure 6:
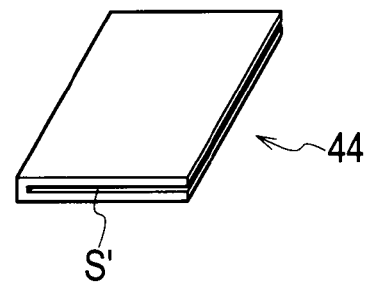
Figure 6:
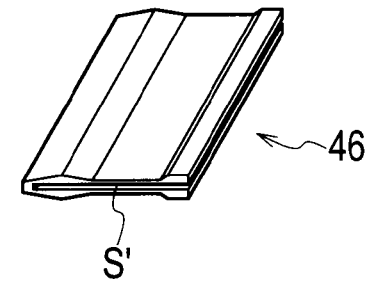
Figure 6:
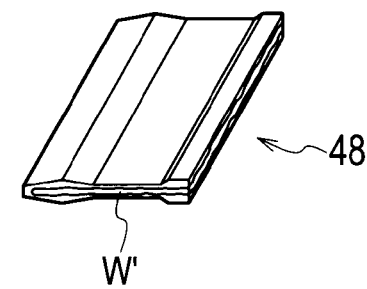
Figure 6:
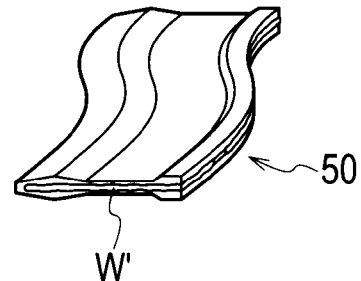
Figure 7:
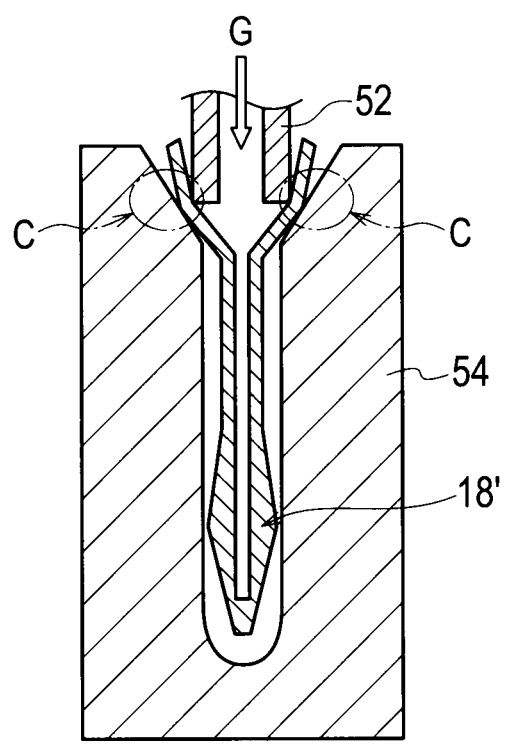
FIG. 7 is a sectional view descriptive of superplastic forming in a method of production according to a third embodiment of the present invention.

These steps described above may be modified in various ways. As shown in FIG. 6 for example, a plate member 42 as it is in a original form such as a rectangular form may be served to slit forming, thereby obtaining a plate member 44 with a slit S'. A plate member 46 with or without a thickness distribution is, by means of executing welding on lips of the slit S', made to from a plate member 48 sealed with a welding material W'. In this state, the plate member 48 is processed with bending to form a plate member 50 with a proper outline. Thereafter, like as those described above, superplastic forming, cutting and finishing are carried out, thereby obtaining a leading edge reinforcement 40.

Further, a modification as described below may be possible. A plate member 18' having a slit but not sealed by welding or such, like as that shown in FIG. 1(d), is prepared. Lips of the slit of the plate member 18' are pressed against a mold 54 by a mold 52 with a flow path for gas. Press-contact C between the mold 54 and the lips of the slit of the plate member 18' constitutes sealing. To prevent gas leakage, the portion of the press-contact C may be comprised of a sealing means such as a gasket or an O-ring. After that, by means of a heater, alone or in combination with heating by heated gas G, the plate member 18' is heated up to a proper temperature, and the interior of the plate member 18' is pressurized by the gas G, thereby executing superplastic forming.

The foremost edge of the leading edge reinforcement 40 is originated from said another side face left connected in the step of slit forming. More specifically, the foremost edge does not undergo a bonding step or a similar step and thus does not contain material discontinuity such as a bonding face. Therefore the product does not give rise to concern about safety, which originates in inclusion of a bonding face. Further, as this method can give a proper sectional profile to the product, the leading edge reinforcement 40 can possess better impact resistance. Further, as shown in FIG. 3(b), the particular portions including the sealed lips are cut out, it is possible to produce a leading edge reinforcement 40, in which any bonding face does not exist even if any other portions are referred. Therefore laborious inspection such as ultrasonic flaw detection can be omitted.

Although the invention has been described above by reference to certain embodiments of the invention, the invention is not limited to the embodiments described above. Modifications and variations of the embodiments described above will occur to those skilled in the art, in light of the above teachings.

INDUSTRIAL APPLICABILITY

Provided is a method of production of members for reinforcing leading edges of fan blades, in which a three-dimensional curved surface is realized by using superplastic forming without leaving diffusion bonding faces in the final products.

The invention claimed is:

1. A production method of a leading edge member of a fan blade comprising:

cutting into a plate member having a first side face and a second side face from the first side face toward the second side face to form a slit with lips that does not reach the second side face;

sealing the lips of the slit to leave an opening;

causing superplastic forming of the plate member by pressurizing the plate member in a mold with gas through the opening; and cutting out a portion of the plate member including the sealed lips.

2. The production method of claim 1, wherein the plate member comprises a titanic superplastic material.

3. The production method of claim 1, wherein the causing the superplastic forming includes heating the plate member up to a temperature ranging from 750 degrees C. to 950 degrees C.

4. The production method of claim 1, wherein the sealing is executed by one selected from the group consisting of welding, brazing, pressure bonding, and press-fitting to the mold.

5. The production method of claim 1, further comprising:

giving a thickness distribution to the plate member.

* * * * *